US012404752B2

(12) United States Patent
Flores et al.

(10) Patent No.: US 12,404,752 B2
(45) Date of Patent: Sep. 2, 2025

(54) INTEGRATED CONTROL OF HORIZONTAL AND VERTICAL MOVEMENTS OF A LONG-STROKE PUMPING UNIT

(71) Applicant: ChampionX LLC, Sugar Land, TX (US)

(72) Inventors: Daniel Flores, Windsor, CO (US); Paul Roberts, Longmont, CO (US)

( * ) Notice: Subject to any disclaimer, the term of this patent is extended or adjusted under 35 U.S.C. 154(b) by 0 days.

(21) Appl. No.: 18/898,047

(22) Filed: Sep. 26, 2024

(65) Prior Publication Data

US 2025/0101840 A1 Mar. 27, 2025

Related U.S. Application Data

(60) Provisional application No. 63/585,798, filed on Sep. 27, 2023.

(51) Int. Cl.

*E21B 43/12* (2006.01)
*B66F 3/25* (2006.01)
*B66F 3/46* (2006.01)

(52) U.S. Cl.

CPC .............. *E21B 43/127* (2013.01); *B66F 3/25* (2013.01); *B66F 3/46* (2013.01)

(58) Field of Classification Search

CPC ............. B66F 3/46; B66F 3/25; E21B 43/127
See application file for complete search history.

(56) References Cited

U.S. PATENT DOCUMENTS 4,290,495 A * 9/1981 Elliston ................. E21B 19/084 173/147
4,761,120 A * 8/1988 Mayer ..................... F04B 47/04 417/403
4,916,959 A 4/1990 Lively
5,524,716 A 6/1996 Wachholz
5,794,723 A * 8/1998 Caneer, Jr. ............ E21B 19/155 175/85

(Continued)

FOREIGN PATENT DOCUMENTS

CN 202482024 U 10/2012
CN 102838060 A 12/2012

(Continued)

OTHER PUBLICATIONS

International Search Report and Written Opinion issued for PCT/US2024/048944 dated Feb. 21, 2025; 12 pgs.
Rotaflex Long-Stroke Pumping Units, weatherford.com, 12 pages.

*Primary Examiner* — Aaron L Lembo
(74) *Attorney, Agent, or Firm* — Scheef & Stone, L.L.P.; Keith C. Rawlins, Esq.

(57) ABSTRACT

A long-stroke pumping unit can be moved away from and toward the wellhead by using a single hydraulic power source via a control interface that is coupled to the hydraulic power source and configured to control both the vertical movement and the horizontal movement of the long-stroke pumping unit. The control interface can control the hydraulic power source for extension and retraction of a hydraulic cylinder for horizontal movement of the unit, and the same control interface can control the same hydraulic power source for extension and retraction of a first vertical hydraulic jack and a second vertical hydraulic jack of the long-stroke pumping unit for vertical movement of an end of the long-stroke pumping unit.

20 Claims, 6 Drawing Sheets

(56) References Cited

U.S. PATENT DOCUMENTS

| | | | | |
|---|---|---|---|---|
| 6,994,171 | B2 * | 2/2006 | Orr | E21B 15/00 173/24 |
| 7,308,953 | B2 * | 12/2007 | Barnes | E21B 7/02 175/203 |
| 9,249,626 | B2 * | 2/2016 | Flusche | E21B 7/026 |
| 10,144,463 | B2 * | 12/2018 | Flusche | B62D 57/032 |
| 10,196,883 | B2 | 2/2019 | Robison et al. | |
| 10,197,050 | B2 | 2/2019 | Robison et al. | |
| 2015/0008039 | A1 | 1/2015 | Wijning et al. | |
| 2016/0186495 | A1 * | 6/2016 | Flusche | B62D 57/032 180/8.6 |
| 2018/0016851 | A1 | 1/2018 | Reddy et al. | |
| 2022/0341266 | A1 | 10/2022 | Zhang | |

FOREIGN PATENT DOCUMENTS

| | | | |
|---|---|---|---|
| CN | 209742855 | U | 12/2019 |
| CN | 210948603 | U | 7/2020 |
| CN | 115306299 | A | 11/2022 |
| GB | 1480814 | A | 7/1977 |

* cited by examiner

INTEGRATED CONTROL OF HORIZONTAL AND VERTICAL MOVEMENTS OF A LONG-STROKE PUMPING UNIT

CROSS-REFERENCE TO RELATED APPLICATIONS

This application is a non-provisional patent application claiming the benefit of, and priority to, U.S. Provisional Patent Application No. 63/585,798, filed Sep. 27, 2023, which is incorporated by reference herein in its entirety.

FIELD OF THE DISCLOSURE

The present disclosure generally relates to long-stroke pumping units, and more particularly relates to moving the long-stroke pumping unit away from the wellhead, for example, to service or repair equipment at the wellhead or in the wellbore.

BACKGROUND

A wellbore can be drilled into a subterranean formation to produce hydrocarbons from a producing portion of the subterranean formation. An artificial lift system, such as a reciprocating rod pumping unit, can be used to carry a production fluid (e.g., containing hydrocarbon fluid) from the subterranean formation, through the wellbore, and to a wellhead located at a surface of the earth. The reciprocating rod pumping unit can include a long-stroke pumping unit, a rod string, and a downhole pump. The reciprocating rod pumping unit has an upstroke and a downstroke that pumps the wellbore fluids from the wellbore to the wellhead.

The long-stroke pumping unit is the surface equipment that is located next to the wellhead. At times, access to the wellhead is needed, such as for repair or maintenance of equipment at the wellhead, of the rod string, of the downhole pump, or combinations thereof. However, portions of the long-stroke pumping unit (e.g., a tower of a tower-style unit) can be positioned on the surface of the earth next to the wellhead such that access to the wellhead by humans is obstructed. In some scenarios, the long-stroke pumping unit is moved in a direction away from the wellhead to create more space between the long-stroke pumping unit and the wellhead, facilitating access to the wellhead for the repair or maintenance. When access to the wellhead is no longer needed, the long-stroke pumping unit can be moved back into position for operation.

Due to the large size and height of a tower-style long-stroke pumping unit, moving the unit can be complex and dangerous. For example, wheels can be added to the base of the tower-style long-stroke pumping unit to move the long-stroke pumping unit away from and toward the wellhead; however, the tower can be leaned to the side to add and remove the wheels. Leaning the tower risks tipping over the long-stroke pumping unit. Moreover, moving the unit involves multiple field personnel to provide the lifting equipment, attach the lifting equipment to the unit, move the unit away from the wellhead, move the unit toward the wellhead (after access to the wellhead is no longer needed), and disengage the lifting equipment from the unit.

SUMMARY

In some aspects, the techniques described herein relate to a long-stroke pumping unit including: a base frame including a pair of parallel rails, wherein the base frame is configured to be positioned on a foundation that is proximate to a wellhead, wherein an end of the base frame faces the wellhead; a tower connected to each of the pair of parallel rails near the end of the base frame; a hydraulic cylinder i) having an end connected to the base frame or to the tower and ii) an opposite end connected to the foundation at a location that is between the pair of parallel rails; a first vertical hydraulic jack coupled to one of the pair of parallel rails at the end of the base frame; a second vertical hydraulic jack coupled to another of the pair of parallel rails at the end of the base frame; a hydraulic power source fluidly connected to the hydraulic cylinder, to the first vertical hydraulic jack, and to the second vertical hydraulic jack; and a control interface coupled to the hydraulic power source and configured to control the hydraulic power source for a movement of i) the hydraulic cylinder between a first extended position and a first retracted position, ii) the first vertical hydraulic jack between a second extended position and a second retracted position, and iii) the second vertical hydraulic jack between a third extended position and a third retracted position.

In some aspects, the techniques described herein relate to a method including: simultaneously actuating, with a hydraulic power source when a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit, wherein the first vertical hydraulic jack and the second vertical hydraulic jack are connected to the end of the long-stroke pumping unit; placing wheels onto the long-stroke pumping unit via the space; and simultaneously actuating, with the hydraulic power source, the first vertical hydraulic jack and the second vertical hydraulic jack to lower the end of the long-stroke pumping unit while the wheels are on the long-stroke pumping unit.

In some aspects, the techniques described herein relate to a method including: simultaneously actuating, with a hydraulic power source while a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit while the long-stroke pumping unit is in a first position; removing wheels from the long-stroke pumping unit via the space; and simultaneously actuating, with the hydraulic power source while the hydraulic cylinder of the long-stroke pumping unit is in the extended position, the first vertical hydraulic jack and the second vertical hydraulic jack to lower the end of the long-stroke pumping unit to directly rest on the foundation while the long-stroke pumping unit is in the first position.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Disclosed is a long-stroke pumping unit that can be moved away from and toward the wellhead without leaning the tower to the side and with fewer field personnel. The movement of the long-stroke pumping unit can be controlled using a single hydraulic power source via a control interface that is coupled to the hydraulic power source and configured to control both the vertical movement and the horizontal movement of the long-stroke pumping unit. The control interface can control the hydraulic power source for extension and retraction of a hydraulic cylinder for horizontal movement of the unit, and the same control interface can control the same hydraulic power source for extension and retraction of a first vertical hydraulic jack and a second vertical hydraulic jack of the long-stroke pumping unit for vertical movement of an end of the long-stroke pumping unit. The control interface is a single point of control for the movement of the long-stroke pumping unit, and the lifting and moving equipment (lifting jacks for vertical movement and hydraulic cylinder for horizontal movement) are integrated with the long-stroke pumping unit. Single point control and equipment integration can reduce the number of field personnel needed to move the long-stroke pumping unit for access to the wellhead and return of the unit for resuming operation. The long-stroke pumping unit described herein is a tower-style long-stroke pumping unit; however, it is contemplated that the vertical and horizontal movement equipment, configurations, and methods disclosed herein can be applied to other types of long-stroke pumping units.

Figure 1A:
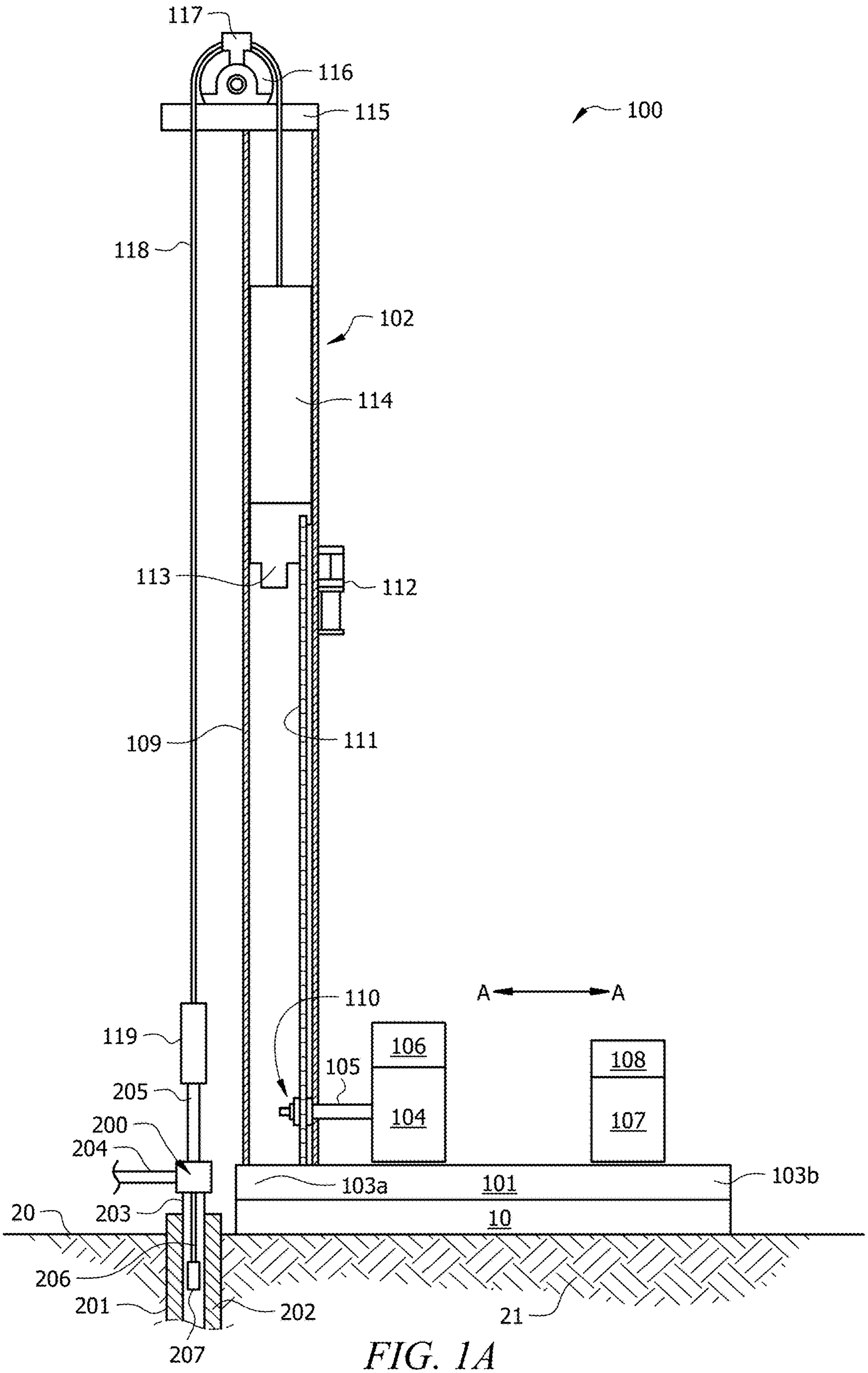
FIG. 1A illustrates a side elevational view of a long-stroke pumping unit in a first position.
Figure 1B:
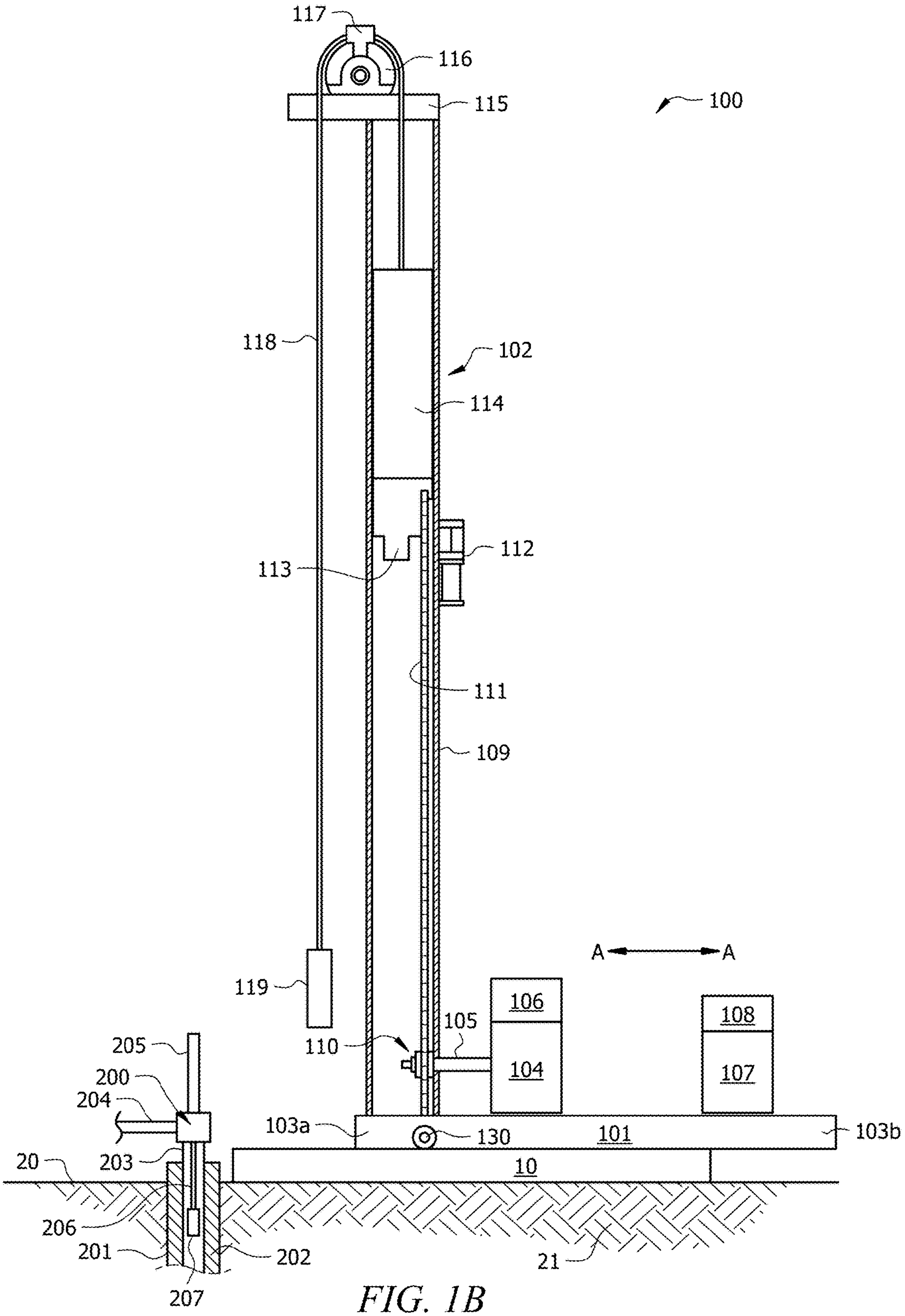
FIG. 1B illustrates a side elevational view of the long-stroke pumping unit in a second position.

FIG. 1A illustrates a side elevational view of a long-stroke pumping unit 100 in a first position, and FIG. 1B illustrates a side elevational view of a long-stroke pumping unit 100 in a second position. In the first position, the long-stroke pumping unit 100 is positioned on a foundation 10 next to a wellhead 200 at the surface 20 of the earth. In the second position, the long-stroke pumping unit 100 is moved horizontally away in the direction of double-headed arrow A from the wellhead 200 such that a distance between the long-stroke pumping unit 100 and the wellhead 200 when the long-stroke pumping unit 100 is in the second position is greater than a distance between the long-stroke pumping unit 100 and the wellhead 200 when the long-stroke pumping unit 100 is in the first position.

In both FIGS. 1A and 1B, a wellbore 201 fluidly connects the wellhead 200 with a producing zone of the subterranean formation 21 in which the wellbore 201 is formed. Casing 202 may extend from the wellhead 200 into at least a portion of the wellbore 201, for example, cemented to the wall of the wellbore 201. Production tubing 203 can extend from the wellhead 200 and into the wellbore 201 within the casing 202. The production tubing 203 can be fluidly connected to a downhole pump.

The wellhead 200 can include any equipment known in the art with the aid of this disclosure, such as a production tree, stuffing box, seals, or combinations thereof. The wellhead 200 fluidly connects with a hydrocarbon production line 204, through which produced fluid flows from the wellhead 200 to another location, such as a storage vessel or pipeline. A polished rod 205 extends through the wellhead 200 (e.g., via seals to prevent leakage of produced fluid from the wellhead 200) and is connected to a rod string 206. The rod string 206 is connected to a plunger 207 that travels upward and downward in the production tubing 203 to move fluids into the hydrocarbon production line 204. The polished rod 205 is coupled to the long-stroke pumping unit 100.

In aspects, the long-stroke pumping unit 100 can be embodied as any tower-type long-stroke pumping unit known in the art with the aid of this disclosure. For example, the long-stroke pumping unit 100 can include a base frame 101, a tower 102 positioned on an end **103*a* of the base frame 101, a prime mover 104 coupled to equipment in the tower 102 via a shaft 105 and positioned on the base frame 101, a control interface 106 for controlling the mechanical equipment in the long-stroke pumping unit 100, a hydraulic power source 107 positioned on the base frame 101 and coupled to the hydraulic cylinder and vertical hydraulic jacks disclosed herein, and a control interface 108 coupled to the hydraulic power source 107 and configured to control the hydraulic power source 107 for extension and retraction of the hydraulic cylinder and vertical hydraulic jacks (for movement of the long-stroke pumping unit 100** vertically and horizontally).

The foundation 10 can be an immovable, level structure, such as a foundation formed of concrete or cement. The foundation 10 can be a single structure formed to support the base frame 101 of the long-stroke pumping unit 100. Alternatively, for some embodiments of the base frame 101, the foundation 10 can be multiple structures that are formed to support the base frame 101. The foundation 10 is generally configured such that the base frame 101 can be moved horizontally in the direction of double headed arrow A-A with respect to the foundation 10.

The base frame 101 is a structure that supports the tower 102, prime mover 104, control interface 106, hydraulic power source 107, and control interface 108. The base frame 101 sits or rests on the foundation 10 and is configured to be positioned on the foundation 10 proximate to the wellhead 200 (at a well site). In aspects, the base frame 101 is not connected to the foundation 10 and is horizontally movable relative to the foundation 10 in the direction of double-headed arrow A-A. In some aspects, the base frame 101 can include a pair of parallel rails (see FIG. 1B, rails **101*a* and 101*b*). The pair of parallel rails can be connected to one another via one or more cross-members (see FIG. 2A, cross members 101*c* and 101*d*). For example, cross-members can connect to each of the rails at end 103*a* and opposite end 103*b* of the base frame 101; additionally or alternatively, cross-members can connect to each of the rails at any location along the rails, for example, to support equipment such as the prime mover 104 and the hydraulic power source 107. In aspects, the parallel rails and the cross-member(s) of the base frame 101 can be formed of interconnected carbon steel beams, for example. The base frame 101** can also be referred to as a skid.

The tower 102 of long-stroke pumping unit 100 can include a housing 109, a drive sprocket 110, a chain 111, a chain idler 112, a carriage 113, a counterweight assembly 114, a top 115, a drum assembly 116, a braking system 117, a load belt 118, and a hanger assembly 119. The configuration of the tower 102 is by example only, and other configurations of the tower 102 are contemplated to fall within the scope of this disclosure.

The housing 109 can be a metal structure configured to house, enclose, and/or support the drive sprocket 110, the chain 111, the chain idler 112, the carriage 113, the counterweight assembly 114, the top 115, the drum assembly 116, the braking system 117, and the load belt 118. The base of the housing 109 can include an amount of lubricant for lubricating the chain 111 as the chain 111 is rotated around the drive sprocket 110. The drive sprocket 110 is mechanically coupled to the prime mover 104 via the shaft 105, and the drive sprocket 110 is also coupled to the chain 111. The chain 111 is also coupled to the carriage 113. In aspects, the chain 111 additionally can be coupled with a chain idler 112 that can be mounted to the housing 109 and configured to maintain a tension of the chain 111 to a setpoint tension. The carriage 113 can be connected to the chain 111 and to the counterweight assembly 114. In aspects, the carriage 113 is configured to allow a transverse movement of the chain 111 relative to the counterweight assembly 114. The counterweight assembly 114 is movable up and down within the housing 109 of the tower 102. The counterweight assembly 114 can include a weight box, one or more counterweights disposed in the weight box, and guide wheels configured to guide the weight box as the counterweight assembly 114 moves in the housing 109. The guide wheels may be connected to the weight box such that the wheels roll along the inside of the housing 109 as the counterweight assembly 114 moves upward and downward within the housing 109. In aspects, a weight of the counterweights can correspond to the weight of the rod string 206 and the weight of the fluid produced in a single stroke of the long-stroke pumping unit 100, such as being equal to a sum of the weight of the rod string 206 and one-half the weight of the fluid produced in a single stroke. The top 115 can be a frame structure that defines the top of the tower 102. The drum assembly 116 is coupled to the top 115 and can include a drum, a shaft, one or more ribs connecting the drum to the shaft, one or more pillow blocks mounted to the top 115, and one or more bearings configured to support the shaft while facilitating rotation of the shaft relative to the pillow blocks. The braking system 117 can include one or more disk brakes or drum brakes, that in aspects, can be operated with hydraulic fluid from the hydraulic power source 107 (e.g., the control interface 108 can be additionally configured to control a supply of pressurized hydraulic fluid to the braking system 117). Alternatively, the braking system 117 can be pneumatically operated. The load belt 118 is a wide and flat belt that has a first end connected to a top of the weight box of the counterweight assembly 114 and a second end coupled to polished rod 205 of the wellhead 200 (e.g., via a hanger assembly 119). The load belt 118 can extend from the top of the counterweight assembly 114 upward through the housing 109 of the tower 102 and upward through the top 115, over an outer surface of the drum of the drum assembly 116, and downward from the drum assembly 116 to the hanger assembly 119. The hanger assembly 119 is connected to the polished rod 205 and to the load belt 118. An optional load sensor can be included between the hanger assembly 119 and the polished rod 205 and configured to send a signal indicating a tension of the rod string 206 to the control interface 106.

In some aspects, the prime mover 104 can include an electric motor powered with electricity produced from a generator (powered by diesel or other hydrocarbon) or obtained from an electrical grid, or the prime mover 104 can include an internal combustion engine fueled by a hydrocarbon fuel such as diesel or natural gas. In aspects where the prime mover 104 includes an electric motor, associated equipment such as an AC/DC converter for converting alternating current received from a power source to direct current for a direct-current electric motor. The control interface 106 can be coupled with the prime mover 104 and can have associated logic to control the rotational speed of the motor.

The first control interface 106 can be mounted to the base frame 101 or to the tower 102. The second control interface 108 can be mounted to the hydraulic power source 107, directly to the base frame 101, or to the tower 102. The first control interface 106 and second control interface 108 may be embodied in the same control computer device; alternatively, may be embodied in separate devices.

The control computer that includes the control interface 106 can include one or more processors, memory, and instructions stored on the memory that cause the one or more processors to receive signals from one or more sensors associated with operation of the long-stroke pumping unit 100 (e.g., a tachometer, a load cell, an accelerometer, or combinations thereof), convert the sensor signals to values associated with the measured parameter, to display and/or store the values with an associated time stamp, and to output signals for control of one or of the equipment of the long-stroke pumping unit 100. The control computer can be networked with any sensors for control of the upstroke and downstroke of the long-stroke pumping unit 100 via wireless or wired data transmission networking (e.g., Wi-Fi, Bluetooth, NFC, ethernet cables, or combinations thereof). In aspects, the control interface 106 can include one or more virtual or physical buttons that control mechanical operation of the long-stroke pumping unit 100. In aspects, the control computer that includes the control interface 106 does not control the hydraulic power source 107 and any of the hydraulic equipment disclosed herein (e.g., the first vertical hydraulic jack 120, the second vertical hydraulic jack 121, the hydraulic cylinder 122 described hereinbelow).

The control computer that includes the control interface 108 can include one or more processors, memory, and instructions stored on the memory that cause the one or more processors to receive signals from one or more sensors associated with operation of the hydraulic power source 107, the first vertical hydraulic jack 120, the second vertical hydraulic jack 121, and the hydraulic cylinder 122 (e.g., pressure transducers), convert the sensor signals to values associated with the measured parameter, to display and/or store the values with an associated time stamp, and to output signals for control of the first vertical hydraulic jack 120, the second vertical hydraulic jack 121, and the hydraulic cylinder 122. The control computer can be networked with any sensors for control of the hydraulics of the long-stroke pumping unit 100 via wireless or wired data transmission networking (e.g., Wi-Fi, Bluetooth, NFC, ethernet cables, or combinations thereof). In aspects, the control interface 108 can include one or more virtual or physical buttons that control valve actuation in the hydraulic power source 107, to controllably supply pressurized hydraulic fluid at various pressures for extension and retraction of the first vertical hydraulic jack 120, the second vertical hydraulic jack 121, and the hydraulic cylinder 122. In some aspects, the control interface 108 can additionally include one or more virtual or physical buttons that control valve actuation in the hydraulic power source 107, to controllably supply pressurized hydraulic fluid at various pressures for operation of the braking system 117.

In operation for pumping hydrocarbons, the control interface 106 is used to control the prime mover 104, e.g., to rotate the drive sprocket 110 via the shaft 105. Rotation of the drive sprocket 110 drives the chain 111 in a loop around the drive sprocket 110 and an idler sprocket of the chain idler 112. The carriage 113 converts the movement of the chain 111 into a vertical (upward or downward) movement of the counterweight assembly 114 within the housing 109 of the tower 102. Vertical movement (upward and downward) of the counterweight assembly 114 moves the load belt 118 to move the hanger assembly 119 upward and downward, which moves the polished rod 205, rod string 206, and plunger 207 upward and downward in the production tubing 203. After downward movement (also called a down stroke) to a barrel at the bottom of the wellbore 201, the plunger 207 is pulled upward by the rod string 206, polished rod 205, hanger assembly 119, and load belt 118 to produce fluid via the hydrocarbon production line 204.

FIG. 1B illustrates that the end 103*b* of the long-stroke pumping unit 100 hangs over the surface 20 of the earth when the long-stroke pumping unit 100 is in the second position; however, the foundation 10 can be configured of any size, such as having a length greater than a length of the long-stroke pumping unit 100 such that the foundation 10 is under the long-stroke pumping unit 100 when the long-stroke pumping unit 100 is in the first position and in the second position.

Figure 2A:
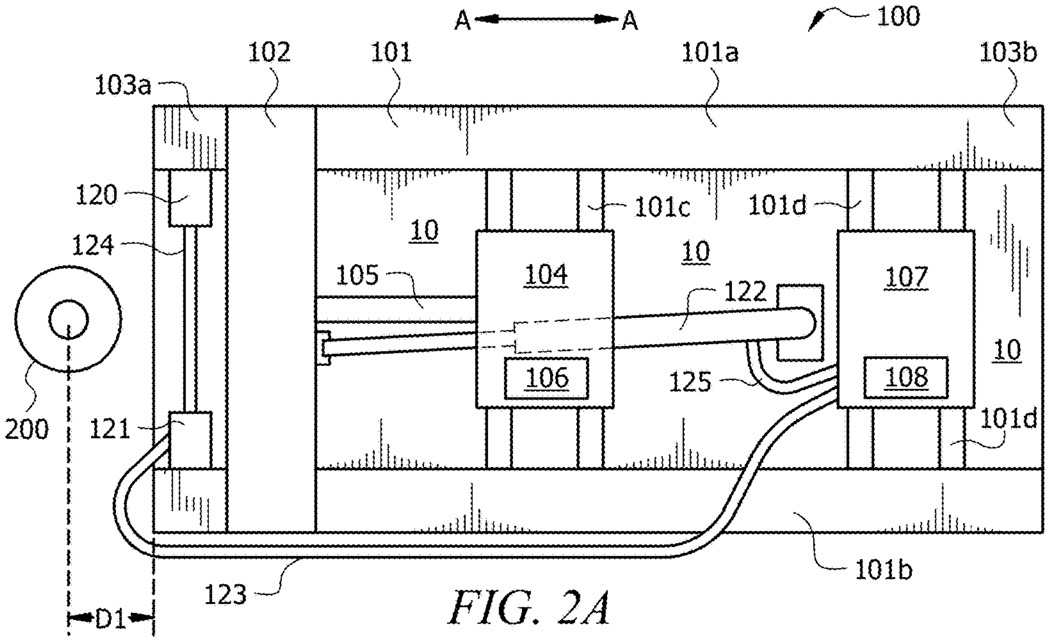
FIG. 2A illustrates a top view of the long-stroke pumping unit in the first position, with the hydraulic cylinder in an extended position.
Figure 2B:
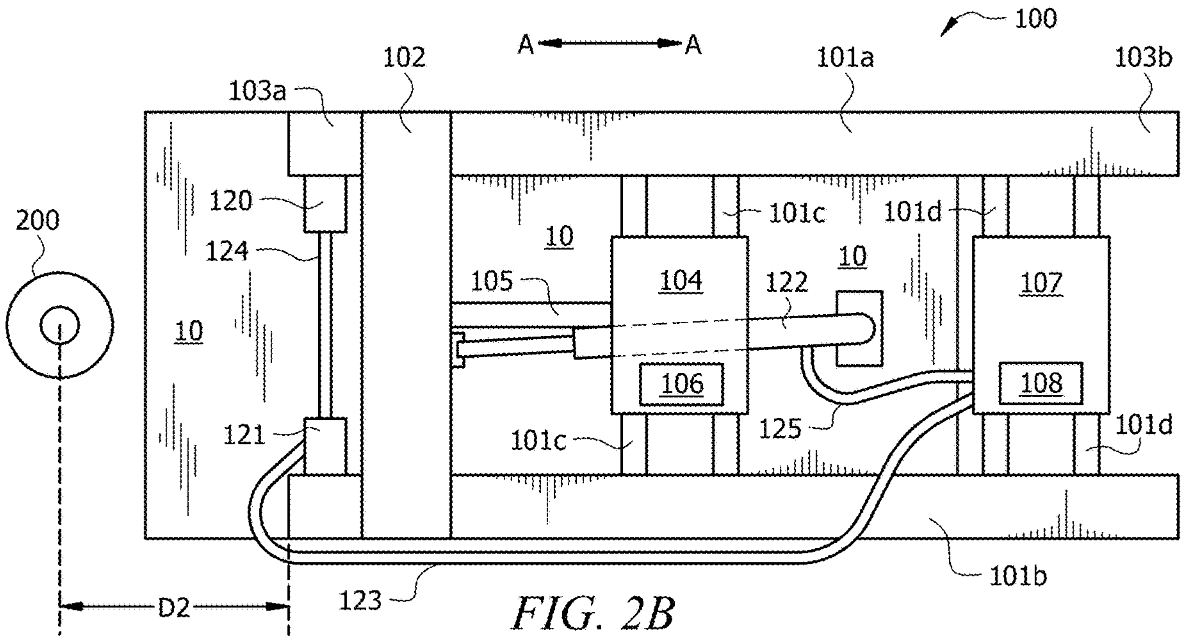
FIG. 2B illustrates a top view of the long-stroke pumping unit in the second position, with the hydraulic cylinder in a retracted position.

FIG. 1B also illustrates at least one wheel 130 that is placed on the base frame 101 (e.g., on or in a wheel-well of rail 101*a* of the base frame 101 illustrated in FIGS. 2A and 2B), for horizontal movement of the base frame 101 between the first position and the second position in the direction of double headed arrow A-A. While one wheel 130 is illustrated in FIG. 1B, additional wheels can be placed on the base frame 101, such as on or the other rail 101*b* of the base frame 101 illustrated in FIGS. 2A and 2B.

In operation for movement of the long-stroke pumping unit 100, the vertical hydraulic jacks disclosed herein lift the end 103*a* of the long-stroke pumping unit 100 upward from the foundation 10, wheels (e.g., such as wheel 130) is/are placed on the base frame 101, the vertical hydraulic jacks lower the end 103*a* of the long-stroke pumping unit 100 downward toward the foundation 10 so that wheels (e.g., wheel 130) engages with the top surface of the foundation 10, and the hydraulic cylinder moves the long-stroke pumping unit 100 from the first position illustrated in FIG. 1A to the second position illustrated in FIG. 1B. The hydraulic power source 107 supplies the pressurized hydraulic fluid for the vertical hydraulic jacks and the hydraulic cylinder, and the hydraulic power source 107 is controlled for movement in both the vertical and horizontal directions via the control interface 108.

FIG. 2A illustrates a top view of a long-stroke pumping unit 100 in the first position, and FIG. 2B illustrates a top view of a long-stroke pumping unit 100 in the second position. FIG. 2A corresponds to the position of the long-stroke pumping unit 100 in FIG. 1A, and FIG. 2B corresponds to the position of the long-stroke pumping unit 100 in FIG. 1B. The top 115, drum assembly 116, braking system 117, load belt 118, and hanger assembly 119 of the long-stroke pumping unit 100 in FIGS. 1A and 1B are not illustrated in FIGS. 2A and 2B for clarity in viewing the first vertical hydraulic jack 120 and the second vertical hydraulic jack 121.

FIGS. 2A and 2B illustrate that a first distance D1 between the end 103*a* of the long-stroke pumping unit 100 (which is the end 103*a* of the base frame 101, and the end 103*a* of the pair of parallel rails 101*a* and 101*b*) when the long-stroke pumping unit 100 is in the first position is less than a second distance D2 between the end 103*a* of the long-stroke pumping unit 100 when the long-stroke pumping unit 100 is in the second position. It can also be seen that the wellhead 200 in FIG. 2B is more accessible with the long-stroke pumping unit 100 in the second position, compared to the location of the long-stroke pumping unit 100 in the first position in FIG. 2A.

FIGS. 2A and 2B illustrate that the long-stroke pumping unit 100 additionally includes a first vertical hydraulic jack 120, a second vertical hydraulic jack 121, and a hydraulic cylinder 122.

The first vertical hydraulic jack 120 is coupled to the first rail 101*a* of the base frame 101, and the second vertical hydraulic jack 120 is coupled to the second rail 101*b* of the base frame 101. While two vertical hydraulic jacks 120 and 121 are illustrated in the figures of this application, alternative embodiments can include more than two vertical hydraulic jacks 120 and 121. For example, a third vertical hydraulic jack can be included between the vertical hydraulic jacks 120 and 121 and connected to the same hydraulic fluid loop as the first and second vertical hydraulic jacks 120 and 121, where the third vertical hydraulic jack is mounted on the base or bottom of the tower 102. In another example, a third vertical hydraulic jack can be connected on an opposite side of rail 101*a* (a side opposite of the side where the first vertical hydraulic jack 120 is mounted) on the end 103*a* of the long-stroke pumping unit 100 and a fourth vertical hydraulic jack can be connected on an opposite side of rail 101*b* (a side opposite of the side where the second vertical hydraulic jack 121 is mounted) on the end 103*a* of the long-stroke pumping unit 100, where the third and fourth vertical hydraulic jacks are both connected to the same hydraulic fluid loop as the first and second vertical hydraulic jacks 120 and 121.

The hydraulic cylinder 122 has an end connected to the foundation 10 and an opposite end connected to the tower 102 (e.g., to the housing of the tower 102). In alternative aspects, the opposite end of the hydraulic cylinder 122 can be connected to one of the rails 101*a* and 101*b* of the base frame 101. While one hydraulic cylinder 122 is illustrated in FIGS. 2A and 2B, alternative embodiments include two or more hydraulic cylinders, where each cylinder has an end connected to the foundation 10 and an opposite end connected to the tower 102, and where each cylinder is in the same hydraulic fluid circuit or loop as the hydraulic cylinder 122.

A hydraulic fluid conduit 123 is connected to the hydraulic power source 107 and the first vertical hydraulic jack 120, the second vertical hydraulic jack 121, or to both the first vertical hydraulic jack 120 and the second vertical hydraulic jack 121. While FIGS. 2A and 2B illustrate an embodiment where the first vertical hydraulic jack 120 is hydraulically connected to the second vertical hydraulic jack by hydraulic fluid conduit 124, and the hydraulic fluid conduit 123 is connected only to the second vertical hydraulic jack 121, alternative embodiments of hydraulic connection of the vertical hydraulic jacks 120 and 121 with the hydraulic power source 107 are contemplated. For example, it is alternatively contemplated the first vertical hydraulic jack 120 can be hydraulically connected to the second vertical hydraulic jack by hydraulic fluid conduit 124, and the hydraulic fluid conduit 123 is connected to the first vertical hydraulic jack 120. Alternatively, it is contemplated that the hydraulic fluid conduit 123 can be split into two portions, where one portion connects directly with the first vertical hydraulic jack 120 and the second portion connects directly with the second vertical hydraulic jack 121 (and there is no hydraulic fluid conduit 124 connecting the vertical hydraulic jacks 120 and 121 to one another). In aspects, the hydraulic fluid conduit 124 can be as two or more conduits that fluidly connect hydraulic fluid in the vertical hydraulic jacks 120 and 121. All embodiments of hydraulic connection of the first vertical hydraulic jack 120 and the second vertical hydraulic jack 121 to the hydraulic power source 107 supply the same pressure of hydraulic fluid to both the first vertical hydraulic jack 120 and the second vertical hydraulic jack 121 such that first vertical hydraulic jack 120 and the second vertical hydraulic jack 121 simultaneously extend or retract at the same rate or speed (e.g., to prevent tipping of the tower 102 of the long-stroke pumping unit 100 to a side).

A hydraulic fluid conduit 125 is connected to the hydraulic power source 107 and to the hydraulic cylinder 122.

When the long-stroke pumping unit 100 is in the first position as illustrated in FIG. 2A, the hydraulic cylinder 122 is in an extended position, and when the long-stroke pumping unit 100 is in the second position as illustrated in FIG. 2B, the hydraulic cylinder 122 is in a retracted position.

Figure 3:
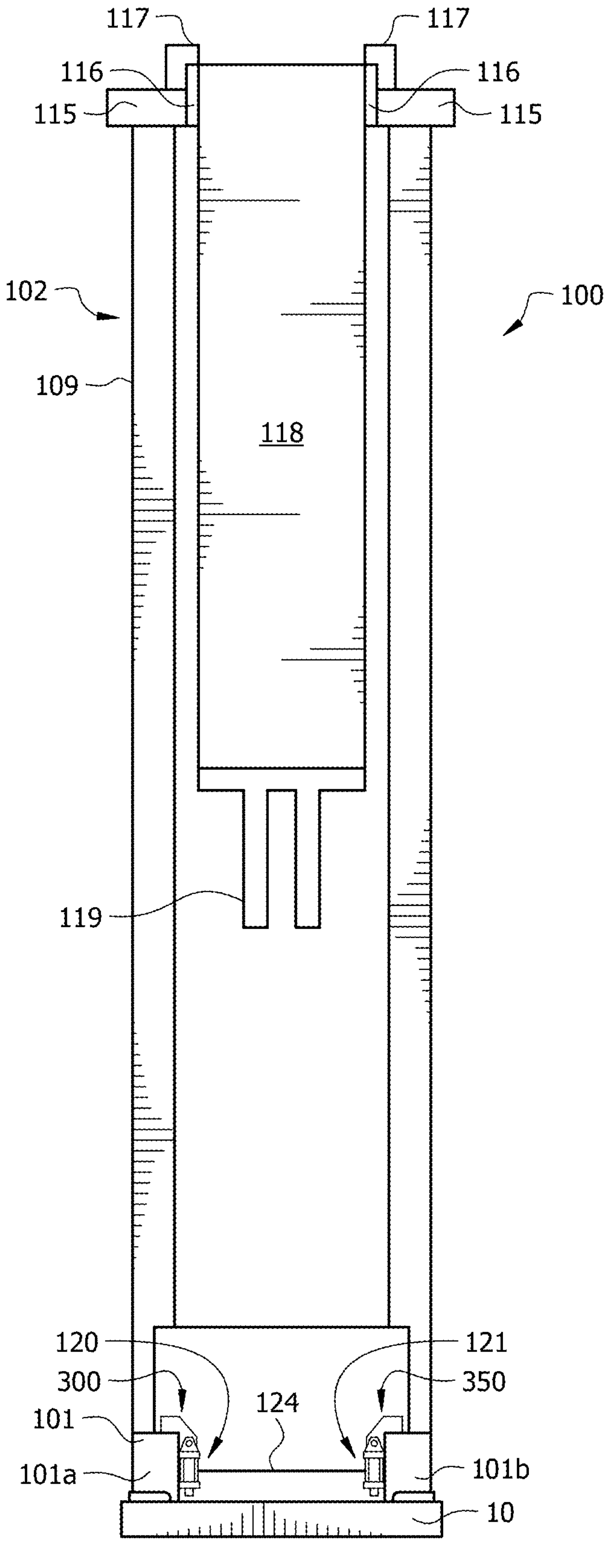
FIG. 3 illustrates an end elevational view of the long-stroke pumping unit.

FIG. 3 illustrates an end elevational view of the long-stroke pumping unit 100. The wellhead 200 and wellbore 201 are not illustrated in FIG. 3 for clarity. The hanger assembly 119 is shown disconnected from the polished rod of the wellhead 200, for viewing of the first hydraulic jack 120 and the second hydraulic jack 121.

Whereas the load belt 118 is illustrated as being thin from the side elevational views in FIGS. 1A and 1B, the load belt 118 can be wide when viewed from the end elevational view in FIG. 3. The load belt 118 can be seen extending around the top of the drum of the drum assembly 116, with the braking system 117 being operably coupled with the drum of the drum assembly 116. As viewed in FIG. 3, the load belt 118 is retracted into and output from the tower 102 in a manner such that the load belt 118 raises and lowers to guide the long upstroke and long downstroke of the pump that is in the wellbore 201 illustrated and described in FIGS. 1A and 1B.

The vertical hydraulic jacks 120 and 121 can be seen in FIG. 3. The first vertical hydraulic jack 120 is coupled to the first rail 101*a* of the base frame 101 via a first mounting assembly 300, and the second vertical hydraulic jack 121 is coupled to the second rail 101*b* of the base frame 101 via a second mounting assembly 350. The hydraulic fluid conduit 124 can be seen extending between the first vertical hydraulic jack 120 and the second vertical hydraulic jack 121. While a single hydraulic fluid conduit 124 is illustrated in FIG. 3, multiple hydraulic fluid conduits can be used, each being connected to both the first vertical hydraulic jack 120 and the second vertical hydraulic jack 121.

Figure 4A:
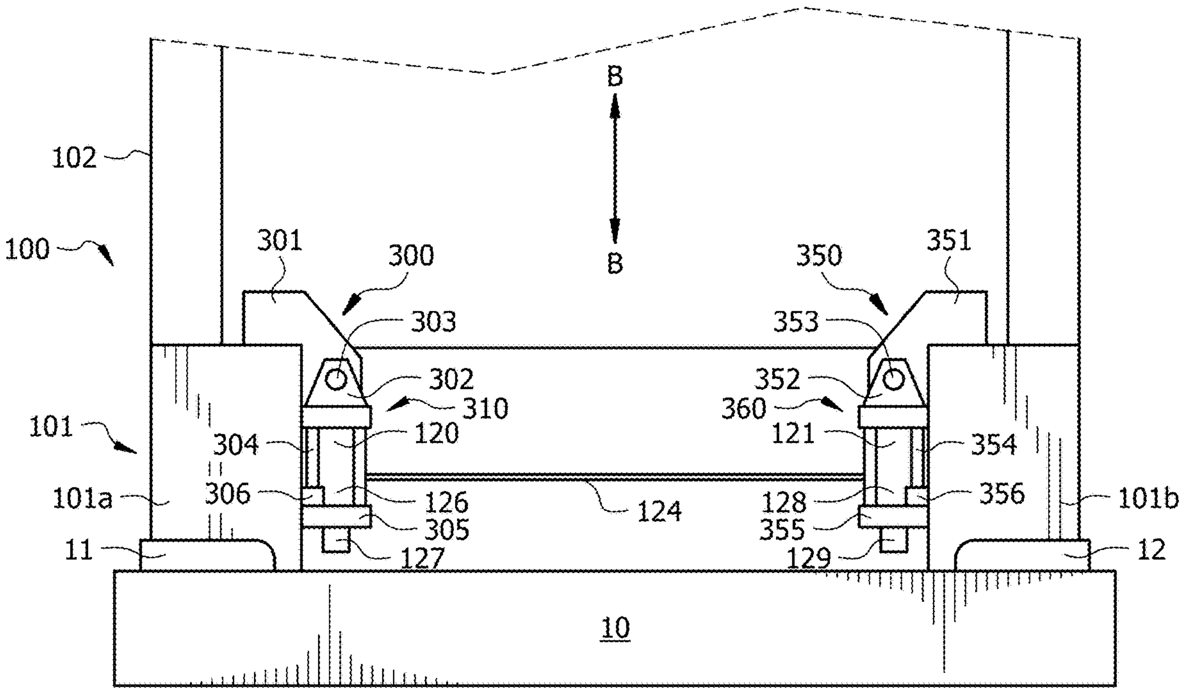
FIG. 4A illustrates a close-up end elevational view of the long-stroke pumping unit, with the vertical hydraulic jacks in a retracted position.
Figure 4B:
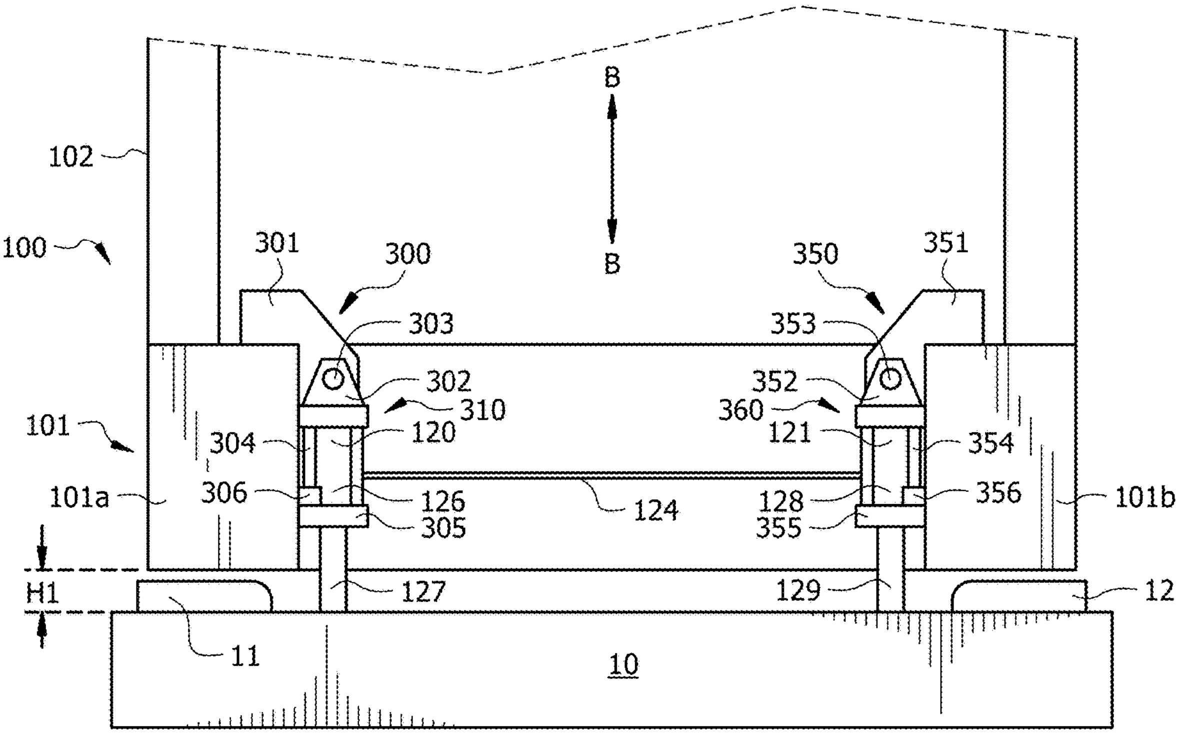
FIG. 4B illustrates a close-up end elevational view of the long-stroke pumping unit, with the vertical hydraulic jacks in an extended position.

FIG. 4A illustrates a close-up end elevational view of the long-stroke pumping unit 100, with the vertical hydraulic jacks 120 and 121 in a retracted position; and FIG. 4B illustrates a close-up end elevational view of the long-stroke pumping unit 100, with the vertical hydraulic jacks 120 and 121 in an extended position.

In FIGS. 4A and 4B, the first vertical hydraulic jack 120 has a housing 126 and a rod 127 that is movable within the housing 126 (e.g., the rod 127 is extendable from the housing 126 and retractable into the housing 126, between a retracted position and an extended position). An end of the rod 127 of the first vertical hydraulic jack 120 faces the foundation 10, e.g., faces a top surface or contact surface of the foundation 10, where a plane of the top surface or contact surface is substantially perpendicular to the direction of movement of the rod 127.

In FIGS. 4A and 4B, the second vertical hydraulic jack 121 has a housing 128 and a rod 129 that is movable within the housing 128 (e.g., the rod 129 is extendable from the housing 128 and retractable into the housing 128, between a retracted position and an extended position). An end of the rod 129 of the second vertical hydraulic jack 121 faces the foundation 10, e.g., faces a top surface or contact surface of the foundation 10, where a plane of the top surface or contact surface is substantially perpendicular to the direction of movement of the rod 129.

The first vertical hydraulic jack 120 is coupled to the rail 101*a* by the first mounting assembly 300. The first mounting assembly 300 can include a bracket 301 connected to the rail 101*a*, e.g., via welds. The first mounting assembly 300 can further include a cage 310 comprising a top portion 302, rods 304, and a bottom portion 305. The cage 310 is configured to hold and contain the first vertical hydraulic jack 120 in a vertical orientation. As used herein "vertical orientation" when used to refer to the orientation of the first vertical hydraulic jack 120 means that the longitudinal movement of the rod 127 of the first vertical hydraulic jack 120 is in a vertical direction, i.e., the direction of double headed arrow B-B in FIGS. 4A and 4B. The top portion 302 is connected to the bracket 301 by a first connector 303 (e.g., embodied as a pin, rod, screw, or a nut and bolt). The top portion 302 is also connected to rods 304, e.g., by welds, by threads on the end of the rods 304, or by connectors (e.g., embodied as screws, lugs, or bolts) that secure the top portion 302 to the rods 304. Opposite ends of the rods 304 are connected to the bottom portion 305, e.g., by welds, by threads on the end of the rods 304, or by connectors (e.g., embodied as screws, lugs, or bolts) that secure the bottom portion 305 to the rods 304. The first vertical hydraulic jack 120 is contained within the cage 310, e.g., contained within the top portion 302, rods 304, and bottom portion 305. The first mounting assembly 300 can further include one or more guide members (e.g., guide member 306 being illustrated in FIGS. 4A and 4B). The guide member(s) 306 is connected to the rail 101*a* and is configured to maintain the cage 310 in a vertical orientation (thus maintaining the first vertical hydraulic jack 120 in a vertical orientation). Each guide member 306 of the first mounting assembly 300 can be secured to cage 310, such as to the bottom portion 305 of the cage 310 via a connector (e.g., embodied as a weld, screw, lug, or bolt).

The second vertical hydraulic jack 121 is coupled to the rail 101*b* by the second mounting assembly 350. The second mounting assembly 350 can include a bracket 351 connected to the rail 101*b*, e.g., via welds. The second mounting assembly 350 can further include a cage 360 comprising a top portion 352, rods 354, and a bottom portion 355. The cage 360 is configured to hold and contain the second vertical hydraulic jack 121 in a vertical orientation. As used herein "vertical orientation" when used to refer to the orientation of the second vertical hydraulic jack 121 means that the longitudinal movement of the rod 129 of the second vertical hydraulic jack 121 is in a vertical direction, i.e., the direction of double headed arrow B-B in FIGS. 4A and 4B. The top portion 352 is connected to the bracket 351 by a first connector 353 (e.g., embodied as a pin, rod, screw, or a nut and bolt). The top portion 352 is also connected to rods 354, e.g., by welds, by threads on the end of the rods 354, or by connectors (e.g., embodied as screws, lugs, or bolts) that secure the top portion 352 to the rods 354. Opposite ends of the rods 354 are connected to the bottom portion 355, e.g., by welds, by threads on the end of the rods 354, or by connectors (e.g., embodied as screws, lugs, or bolts) that secure the bottom portion 355 to the rods 354. The first vertical hydraulic jack 121 is contained within the cage 360, e.g., contained within the top portion 352, rods 354, and bottom portion 355. The second mounting assembly 350 can further include one or more guide members (e.g., guide member 356 being illustrated in FIGS. 4A and 4B). The guide member(s) 356 is connected to the rail 101*b* and is configured to maintain the cage 360 in a vertical orientation (thus maintaining the second vertical hydraulic jack 121 in a vertical orientation). Each guide member(s) 356 of the second mounting assembly 350 can be secured to cage 360, such as to the bottom portion 355 of the cage 360 via a connector (e.g., embodied as a weld, screw, lug, or bolt).

Operation can be described starting with the view in FIG. 4A. Pressurized hydraulic fluid (e.g., a liquid primarily including mineral oil or water) can be provided to the first vertical hydraulic jack 120 and to the second vertical hydraulic jack 121 via operation of the hydraulic power source 107 via input to the control interface 108. The pressurized hydraulic fluid can cause the rods 127 and 129 to extend out of the housings 126 and 128 to contact the top surface of the foundation 10 and then lift the end of the long-stroke pumping unit 100 vertically upward such that a space is formed between the bottom of the end of the long-stroke pumping unit 100 and the top surface of the foundation 10, as illustrated in FIG. 4B. A height H1 of the space is indicated in FIG. 4B, and the height H1 is of a dimension sufficient for field personnel to place wheels on or in wheel wells of the rails 101*a* and 101*b*. Once wheels are placed on the rails 101*a* and 101*b*, pressurized fluid can be controllably released via input to the control interface 108 from the vertical hydraulic jacks 120 and 121 to cause the rods 127 and 129 to begin retraction back into the housings 126 and 128, thus lowering the end of the long-stroke pumping unit 100 vertically downward toward the top surface of the foundation 10. The rods 127 and 129 can be further retracted into the housings 126 and 128, to a retracted position in FIG. 4A.

Guiderails 11 and 12 are also illustrated in FIGS. 4A and 4B. The guiderails 11 and 12 can be attached to the foundation 10 to prevent movement of the long-stroke pumping unit 100 beyond the guiderails 11 and 12 (e.g., when the hydraulic cylinder 122 is actuated to move the long-stroke pumping unit 100 from the second position back to the first position). The configuration of the guiderails 11 and 12 is not limited by the disclosure, and additional guiderails to prevent side-to-side movement of the long-stroke pumping unit 100 can be utilized.

Figure 5:
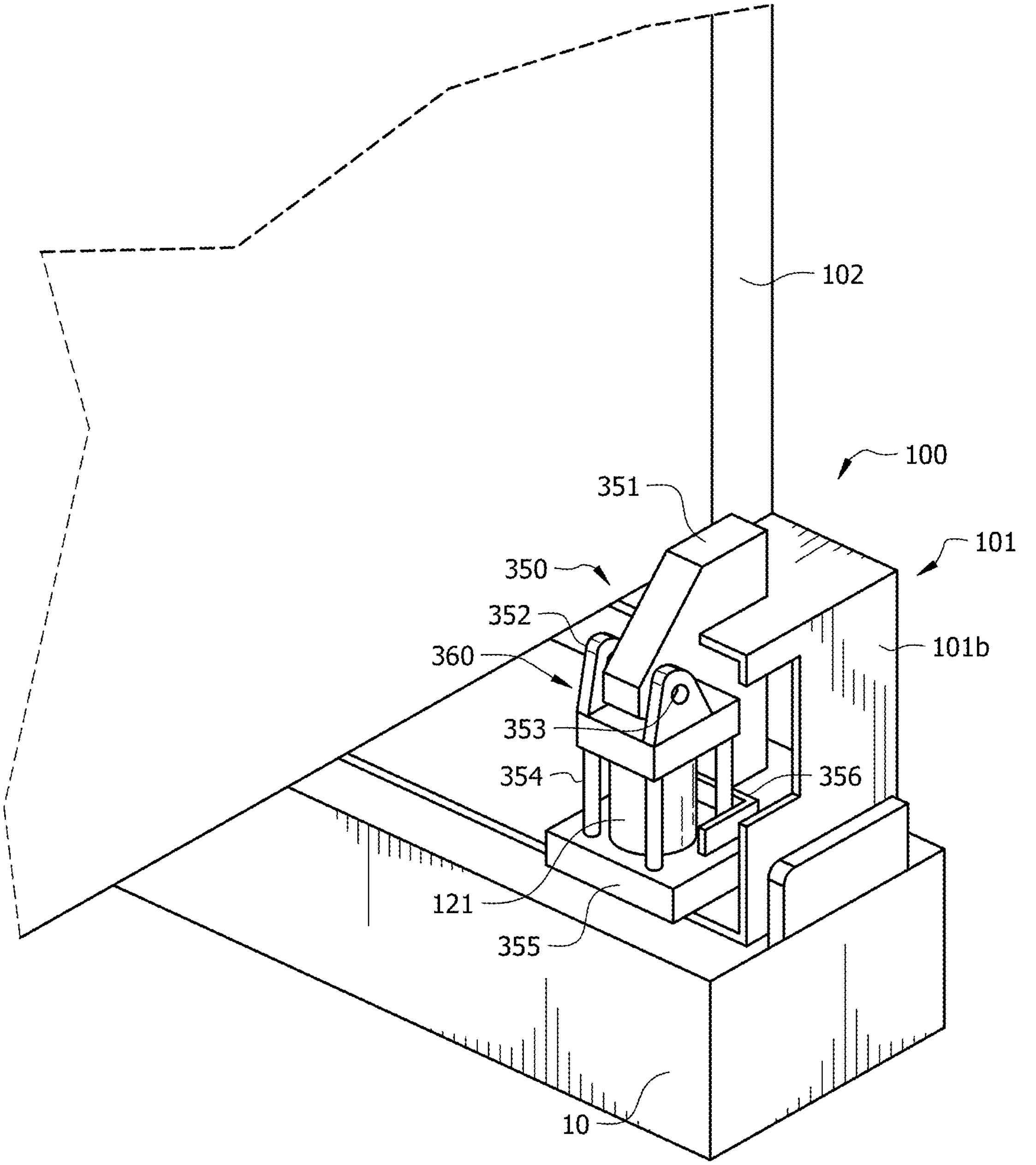
FIG. 5 illustrates a perspective view of a vertical hydraulic jack on the end of the long-stroke pumping unit.

FIG. 5 illustrates a perspective view of the second vertical hydraulic jack 121 on the end of the long-stroke pumping unit 100. The bracket 351 of the second mounting assembly 350 can be seen connected to the rail 101*b* of the base frame 101. The cage 360 can be seen coupled to the bracket 351, and the guide member 356 is connected to the bottom portion 355 of the cage 360 to maintain the second vertical hydraulic jack 121 in a vertical orientation.

Methods

A method disclosed herein involves using the hydraulic power source 107 to control, via a single control interface 108 for the hydraulic power source 107, the vertical hydraulic jacks 120 and 121 and the hydraulic cylinder 122 for vertical and horizontal movement of the long-stroke pumping unit 100.

One method can include simultaneously actuating, with the hydraulic power source 107 when the hydraulic cylinder 122 of the long-stroke pumping unit 100 is in an extended position, the first vertical hydraulic jack 120 and the second vertical hydraulic jack 121 to lift an end 103*a* of the long-stroke pumping unit 100 upward such that a space is formed between the end 103*a* of the long-stroke pumping unit 100 and the foundation 10 that is under the long-stroke pumping unit 100; placing wheels 130 onto the long-stroke pumping unit 100 via the space; and simultaneously actuating, with the hydraulic power source 107, the first vertical hydraulic jack 120 and the second vertical hydraulic jack 121 to lower the end 103*a* of the long-stroke pumping unit 100 while the wheels 130 are on the long-stroke pumping unit 100. The method can also include, after placing the wheels 130, actuating, with the hydraulic power source 107, the hydraulic cylinder 122 from the extended position to a retracted position to move the long-stroke pumping unit 100 from the first position to the second position while the wheels 130 are on the long-stroke pumping unit 100. The method can additionally include actuating, with the hydraulic power source 107, the hydraulic cylinder 122 from the retracted position to the extended position to move the long-stroke pumping unit 100 from the second position to the first position while the wheels 130 are on the long-stroke pumping unit 100; simultaneously actuating, with the hydraulic power source 107 while the hydraulic cylinder 122 is in the extended position, the first vertical hydraulic jack 120 and the second vertical hydraulic jack 121 to lift the end 103*a* of a long-stroke pumping unit 100 upward such that the space is again formed between the end 103*a* of the long-stroke pumping unit 100 and the foundation 10 while the long-stroke pumping unit 100 is in the first position; removing the wheels 130 from the long-stroke pumping unit 100 via the space while the long-stroke pumping unit 100 is in the first position; and simultaneously actuating, with the hydraulic power source 107 while the hydraulic cylinder 122 is in the extended position, the first vertical hydraulic jack 121 and the second vertical hydraulic jack 121 to lower the end 103*a* of the long-stroke pumping unit 100 to directly rest on the foundation 10 while the long-stroke pumping unit 100 is in the first position. The control interface 108 can control operation of the hydraulic power source 107 in all steps of the method. In aspects, the first vertical hydraulic jack 120 and the second vertical hydraulic jack 121 are not removed from the long-stroke pumping unit 100 after performance of any step of the method, e.g., after simultaneously actuating the first vertical hydraulic jack 120 and the second vertical hydraulic jack 121 to lower the end 103*a* of the long-stroke pumping unit 100 while the wheels 130 are on the long-stroke pumping unit 100, or after simultaneously actuating the first vertical hydraulic jack 120 and the second vertical hydraulic jack 121 to lower the end 103*a* of the long-stroke pumping unit 100 to directly rest on the foundation 10 (without wheels 130) while the long-stroke pumping unit is in the first position.

Another method can include simultaneously actuating, with the hydraulic power source 107 while a hydraulic cylinder 122 of a long-stroke pumping unit 100 is in an extended position, a first vertical hydraulic jack 120 and a second vertical hydraulic jack 121 to lift an end 103*a* of the long-stroke pumping unit 100 upward such that a space is formed between the end 103*a* of the long-stroke pumping unit 100 and a foundation 10 that is under the long-stroke pumping unit 100 while the long-stroke pumping unit 100 is in a first position; removing wheels 130 from the long-stroke pumping unit 100 via the space; and simultaneously actuating, with the hydraulic power source 107 while the hydraulic cylinder 122 of the long-stroke pumping unit 100 is in the extended position, the first vertical hydraulic jack 120 and the second vertical hydraulic jack 121 to lower the end 103*a* of the long-stroke pumping unit 100 to directly rest on the foundation 10 while the long-stroke pumping unit 100 is in the first position. The method can additionally include prior to simultaneously actuating the first vertical hydraulic jack 120 and the second vertical hydraulic jack 121 to lift the end 103*a* of the long-stroke pumping unit 100, actuating, with the hydraulic power source 107, the hydraulic cylinder 122 from the retracted position to the extended position to move the long-stroke pumping unit 100 from a second position to the first position while the wheels 130 are on the long-stroke pumping unit 100. The method can also include after actuating, with the hydraulic power source 107, the hydraulic cylinder 122 from the retracted position to the extended position, simultaneously actuating, with the hydraulic power source 107 when the hydraulic cylinder 122 is in the extended position, the first vertical hydraulic jack 120 and the second vertical hydraulic jack 121 to lift the end 103*a* of the long-stroke pumping unit 100 upward such that the space is again formed between the end 103*a* of the long-stroke pumping unit 100 and the foundation 10, wherein the first vertical hydraulic jack 120 and the second vertical hydraulic jack 121 are connected to the end 103*a* of the long-stroke pumping unit 100; placing the wheels 130 onto the long-stroke pumping unit 100 via the space; and simultaneously actuating, with the hydraulic power source 107, the first vertical hydraulic jack 120 and the second vertical hydraulic jack 121 to lower the end 130*a* of the long-stroke pumping unit 100 while the wheels 130 are on the long-stroke pumping unit 100. The method can also include actuating, with the hydraulic power source 107, the hydraulic cylinder 122 from the extended position to the retracted position to move the long-stroke pumping unit 100 from the first position to the second position while the wheels 130 are on the long-stroke pumping unit 100. The control interface 108 can control operation of the hydraulic power source 107 in all steps of the method. In aspects of the method, the first vertical hydraulic jack 120 and the second vertical hydraulic jack 121 are not removed from the long-stroke pumping unit 100 after simultaneously actuating the first vertical hydraulic jack 120 and the second vertical hydraulic jack 121 to lower the end 103*a* of the long-stroke pumping unit 100 to directly rest on the foundation 10 while the long-stroke pumping unit 100 is in the first position.

In aspects of the methods, a first distance D1 between the long-stroke pumping unit 100 and the wellhead 200 when the long-stroke pumping unit 100 is in the first position is less than a second distance D2 between the long-stroke pumping unit 100 and the wellhead 200 when the long-stroke pumping unit 100 is in the second position.

Additional Description

Aspect 1. A long-stroke pumping unit comprising: a base frame comprising a pair of parallel rails, wherein the base frame is configured to be positioned on a foundation that is proximate to a wellhead, wherein an end of the base frame faces the wellhead; a tower connected to each of the pair of parallel rails near the end of the base frame; a hydraulic cylinder having an end connected to the base frame or to the tower and an opposite end connected to the foundation; a first vertical hydraulic jack coupled to one of the pair of parallel rails at the end of the base frame; a second vertical hydraulic jack coupled to another of the pair of parallel rails at the end of the base frame; a hydraulic power source fluidly connected to the hydraulic cylinder, to the first vertical hydraulic jack, and to the second vertical hydraulic jack; and a control interface coupled to the hydraulic power source and configured to control the hydraulic power source for a movement of i) the hydraulic cylinder between a first extended position and a first retracted position, ii) the first vertical hydraulic jack between a second extended position and a second retracted position, and iii) the second vertical hydraulic jack between a third extended position and a third retracted position.

Aspect 2. The long-stroke pumping unit of Aspect 1, wherein each of the first vertical hydraulic jack and the second vertical hydraulic jack comprises a housing and a rod movable within the housing, wherein an end of the rod of each of the first vertical hydraulic jack and the second vertical hydraulic jack faces the foundation.

Aspect 3. The long-stroke pumping unit of any one of Aspects 1 to 2, being in a first position while the hydraulic cylinder is in the first extended position.

Aspect 4. The long-stroke pumping unit of any one of Aspects 1 to 3, being in a second position while the hydraulic cylinder is in the first retracted position.

Aspect 5. The long-stroke pumping unit of Aspect 3 or 4, where the first vertical hydraulic jack and the second vertical hydraulic jack are connected to the end of the base frame when the long-stroke pumping unit is in the first position and when the long-stroke pumping unit is in the second position.

Aspect 6. The long-stroke pumping unit of any one of Aspects 1 to 5, further comprising: a first mounting assembly connected to the one of the pair of parallel rails and to the first vertical hydraulic jack; and a second mounting assembly connected to the another of the pair of parallel rails and to the first vertical hydraulic jack.

Aspect 7. The long-stroke pumping unit of Aspect 6, wherein: the first mounting assembly comprises a first bracket connected to the one of the pair of parallel rails, and a first cage connected to the first bracket, wherein the first cage is configured to hold and contain the first vertical hydraulic jack in a vertical orientation, and the second mounting assembly comprises a second bracket connected to the another of the pair of parallel rails, and a second cage connected to the second bracket, wherein the second cage is configured to hold and contain the second vertical hydraulic jack in the vertical orientation.

Aspect 8. The long-stroke pumping unit of Aspect 7, wherein: the first mounting assembly further comprises a first guide member connected to the one of the pair of parallel rails and to the first cage, and the second mounting assembly further comprises a second guide member connected to the another of the pair of parallel rails and to the second cage.

Aspect 9. The long-stroke pumping unit of Aspect 8, wherein: the first cage comprises a first top portion connected to the first bracket, a first plurality of rods having ends connected to the first top portion, and a first bottom portion connected to opposite ends of the first plurality of rods, wherein the first vertical hydraulic jack is contained within the first top portion, the first plurality of rods, and the first bottom portion, and the second cage comprises a second top portion connected to the second bracket, a second plurality of rods having ends connected to the second top portion, and a second bottom portion connected to opposite ends of the second plurality of rods, wherein the second vertical hydraulic jack is contained within the second top portion, the second plurality of rods, and the second bottom portion.

Aspect 10. The long-stroke pumping unit of Aspect 9, wherein: the first guide member is connected to the first bottom portion of the first cage; and the second guide member is connected to the second bottom portion of the second cage.

Aspect 11. A method comprising: simultaneously actuating, with a hydraulic power source when a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit, wherein the first vertical hydraulic jack and the second vertical hydraulic jack are connected to the end of the long-stroke pumping unit; placing wheels onto the long-stroke pumping unit via the space; and simultaneously actuating, with the hydraulic power source, the first vertical hydraulic jack and the second vertical hydraulic jack to lower the end of the long-stroke pumping unit while the wheels are on the long-stroke pumping unit.

Aspect 12. The method of Aspect 11, further comprising: actuating, with the hydraulic power source, the hydraulic cylinder from the extended position to a retracted position to move the long-stroke pumping unit from a first position to a second position while the wheels are on the long-stroke pumping unit, wherein a first distance between the long-stroke pumping unit and a wellhead when the long-stroke pumping unit is in the first position is less than a second distance between the long-stroke pumping unit and the wellhead when the long-stroke pumping unit is in the second position.

Aspect 13. The method of Aspect 11 or 12, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit.

Aspect 14. The method of Aspect 12 or 13, further comprising: actuating, with the hydraulic power source, the hydraulic cylinder from a retracted position to the extended position to move the long-stroke pumping unit from the second position to the first position while the wheels are on the long-stroke pumping unit; simultaneously actuating, with the hydraulic power source while the hydraulic cylinder is in the extended position, the first vertical hydraulic jack and the second vertical hydraulic jack to lift the end of a long-stroke pumping unit upward such that the space is again formed between the end of the long-stroke pumping unit and the foundation while the long-stroke pumping unit is in the first position; removing wheels from the long-stroke pumping unit via the space while the long-stroke pumping unit is in the first position; and simultaneously actuating, with the hydraulic power source while the hydraulic cylinder is in the extended position, the first vertical hydraulic jack and the second vertical hydraulic jack to lower the end of the long-stroke pumping unit to directly rest on the foundation while the long-stroke pumping unit is in the first position.

Aspect 15. The method of Aspect 14, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit to directly rest on the foundation while the long-stroke pumping unit is in the first position.

Aspect 16. A method comprising: simultaneously actuating, with a hydraulic power source while a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit while the long-stroke pumping unit is in a first position; removing wheels from the long-stroke pumping unit via the space; and simultaneously actuating, with the hydraulic power source while the hydraulic cylinder of the long-stroke pumping unit is in the extended position, the first vertical hydraulic jack and the second vertical hydraulic jack to lower the end of the long-stroke pumping unit to directly rest on the foundation while the long-stroke pumping unit is in the first position.

Aspect 17. The method of Aspect 16, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit to directly rest on the foundation while the long-stroke pumping unit is in the first position.

Aspect 18. The method of Aspect 16, further comprising: prior to simultaneously actuating the first vertical hydraulic jack and the second vertical hydraulic jack to lift the end of the long-stroke pumping unit, actuating, with the hydraulic power source, the hydraulic cylinder from a retracted position to the extended position to move the long-stroke pumping unit from a second position to the first position while the wheels are on the long-stroke pumping unit, wherein a first distance between the long-stroke pumping unit and a wellhead when the long-stroke pumping unit is in the first position is less than a second distance between the long-stroke pumping unit and the wellhead when the long-stroke pumping unit is in the second position.

Aspect 19. The method of Aspect 18, further comprising: after actuating, with the hydraulic power source, the hydraulic cylinder from a retracted position to the extended position, simultaneously actuating, with the hydraulic power source when the hydraulic cylinder is in the extended position, the first vertical hydraulic jack and the second vertical hydraulic jack to lift the end of the long-stroke pumping unit upward such that the space is again formed between the end of the long-stroke pumping unit and the foundation, wherein the first vertical hydraulic jack and the second vertical hydraulic jack are connected to the end of the long-stroke pumping unit; placing the wheels onto the long-stroke pumping unit via the space; and simultaneously actuating, with the hydraulic power source, the first vertical hydraulic jack and the second vertical hydraulic jack to lower the end of the long-stroke pumping unit while the wheels are on the long-stroke pumping unit.

Aspect 20. The method of Aspect 19, further comprising: actuating, with the hydraulic power source, the hydraulic cylinder from the extended position to the retracted position to move the long-stroke pumping unit from the first position to the second position while the wheels are on the long-stroke pumping unit.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A long-stroke pumping unit comprising:

a base frame comprising a pair of parallel rails, wherein the base frame is configured to be positioned on a foundation that is proximate to a wellhead, wherein an end of the base frame faces the wellhead;

a tower connected to each of the pair of parallel rails near the end of the base frame;

a hydraulic cylinder having an end connected to the base frame or to the tower and an opposite end connected to the foundation;

a first vertical hydraulic jack coupled to one of the pair of parallel rails at the end of the base frame;

a second vertical hydraulic jack coupled to another of the pair of parallel rails at the end of the base frame;

a hydraulic power source fluidly connected to the hydraulic cylinder, to the first vertical hydraulic jack, and to the second vertical hydraulic jack; and a control interface coupled to the hydraulic power source and configured to control the hydraulic power source for a movement of i) the hydraulic cylinder between a first extended position and a first retracted position, ii) the first vertical hydraulic jack between a second extended position and a second retracted position, and iii) the second vertical hydraulic jack between a third extended position and a third retracted position.

2. The long-stroke pumping unit of claim 1, wherein each of the first vertical hydraulic jack and the second vertical hydraulic jack comprises a housing and a rod movable within the housing, wherein an end of the rod of each of the first vertical hydraulic jack and the second vertical hydraulic jack faces the foundation.

3. The long-stroke pumping unit of claim 1, being in a first position while the hydraulic cylinder is in the first extended position.

4. The long-stroke pumping unit of claim 3, being in a second position while the hydraulic cylinder is in the first retracted position.

5. The long-stroke pumping unit of claim 4, where the first vertical hydraulic jack and the second vertical hydraulic jack are connected to the end of the base frame when the long-stroke pumping unit is in the first position and when the long-stroke pumping unit is in the second position.

6. The long-stroke pumping unit of claim 1, further comprising:

a first mounting assembly connected to the one of the pair of parallel rails and to the first vertical hydraulic jack; and a second mounting assembly connected to the another of the pair of parallel rails and to the first vertical hydraulic jack.

7. The long-stroke pumping unit of claim 6, wherein:

the first mounting assembly comprises a first bracket connected to the one of the pair of parallel rails, and a first cage connected to the first bracket, wherein the first cage is configured to hold and contain the first vertical hydraulic jack in a vertical orientation, and the second mounting assembly comprises a second bracket connected to the another of the pair of parallel rails, and a second cage connected to the second bracket, wherein the second cage is configured to hold and contain the second vertical hydraulic jack in the vertical orientation.

8. The long-stroke pumping unit of claim 7, wherein:

the first mounting assembly further comprises a first guide member connected to the one of the pair of parallel rails and to the first cage, and the second mounting assembly further comprises a second guide member connected to the another of the pair of parallel rails and to the second cage.

9. The long-stroke pumping unit of claim 8, wherein:

the first cage comprises a first top portion connected to the first bracket, a first plurality of rods having ends connected to the first top portion, and a first bottom portion connected to opposite ends of the first plurality of rods, wherein the first vertical hydraulic jack is contained within the first top portion, the first plurality of rods, and the first bottom portion, and the second cage comprises a second top portion connected to the second bracket, a second plurality of rods having ends connected to the second top portion, and a second bottom portion connected to opposite ends of the second plurality of rods, wherein the second vertical hydraulic jack is contained within the second top portion, the second plurality of rods, and the second bottom portion.

10. The long-stroke pumping unit of claim 9, wherein:

the first guide member is connected to the first bottom portion of the first cage; and the second guide member is connected to the second bottom portion of the second cage.

11. A method comprising:

simultaneously actuating, with a hydraulic power source when a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit, wherein the first vertical hydraulic jack and the second vertical hydraulic jack are connected to the end of the long-stroke pumping unit;

placing wheels onto the long-stroke pumping unit via the space; and simultaneously actuating, with the hydraulic power source, the first vertical hydraulic jack and the second vertical hydraulic jack to lower the end of the long-stroke pumping unit while the wheels are on the long-stroke pumping unit.

12. The method of claim 11, further comprising:

actuating, with the hydraulic power source, the hydraulic cylinder from the extended position to a retracted position to move the long-stroke pumping unit from a first position to a second position while the wheels are on the long-stroke pumping unit, wherein a first distance between the long-stroke pumping unit and a wellhead when the long-stroke pumping unit is in the first position is less than a second distance between the long-stroke pumping unit and the wellhead when the long-stroke pumping unit is in the second position.

13. The method of claim 12, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit.

14. The method of claim 13, further comprising:

actuating, with the hydraulic power source, the hydraulic cylinder from a retracted position to the extended position to move the long-stroke pumping unit from the second position to the first position while the wheels are on the long-stroke pumping unit;

simultaneously actuating, with the hydraulic power source while the hydraulic cylinder is in the extended position, the first vertical hydraulic jack and the second vertical hydraulic jack to lift the end of a long-stroke pumping unit upward such that the space is again formed between the end of the long-stroke pumping unit and the foundation while the long-stroke pumping unit is in the first position;

removing wheels from the long-stroke pumping unit via the space while the long-stroke pumping unit is in the first position; and simultaneously actuating, with the hydraulic power source while the hydraulic cylinder is in the extended position, the first vertical hydraulic jack and the second vertical hydraulic jack to lower the end of the long-stroke pumping unit to directly rest on the foundation while the long-stroke pumping unit is in the first position.

15. The method of claim 14, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit to directly rest on the foundation while the long-stroke pumping unit is in the first position.

16. A method comprising:

simultaneously actuating, with a hydraulic power source while a hydraulic cylinder of a long-stroke pumping unit is in an extended position, a first vertical hydraulic jack and a second vertical hydraulic jack to lift an end of the long-stroke pumping unit upward such that a space is formed between the end of the long-stroke pumping unit and a foundation that is under the long-stroke pumping unit while the long-stroke pumping unit is in a first position;

removing wheels from the long-stroke pumping unit via the space; and simultaneously actuating, with the hydraulic power source while the hydraulic cylinder of the long-stroke pumping unit is in the extended position, the first vertical hydraulic jack and the second vertical hydraulic jack to lower the end of the long-stroke pumping unit to directly rest on the foundation while the long-stroke pumping unit is in the first position.

17. The method of claim 16, wherein the first vertical hydraulic jack and the second vertical hydraulic jack are not removed from the long-stroke pumping unit after simultaneously actuating the first vertical hydraulic jack and the second vertical hydraulic jack to lower the end of the long-stroke pumping unit to directly rest on the foundation while the long-stroke pumping unit is in the first position.

18. The method of claim 16, further comprising:

prior to simultaneously actuating the first vertical hydraulic jack and the second vertical hydraulic jack to lift the end of the long-stroke pumping unit, actuating, with the hydraulic power source, the hydraulic cylinder from a retracted position to the extended position to move the long-stroke pumping unit from a second position to the first position while the wheels are on the long-stroke pumping unit, wherein a first distance between the long-stroke pumping unit and a wellhead when the long-stroke pumping unit is in the first position is less than a second distance between the long-stroke pumping unit and the wellhead when the long-stroke pumping unit is in the second position.

19. The method of claim 18, further comprising:

after actuating, with the hydraulic power source, the hydraulic cylinder from a retracted position to the extended position, simultaneously actuating, with the hydraulic power source when the hydraulic cylinder is in the extended position, the first vertical hydraulic jack and the second vertical hydraulic jack to lift the end of the long-stroke pumping unit upward such that the space is again formed between the end of the long-stroke pumping unit and the foundation, wherein the first vertical hydraulic jack and the second vertical hydraulic jack are connected to the end of the long-stroke pumping unit;

placing the wheels onto the long-stroke pumping unit via the space; and simultaneously actuating, with the hydraulic power source, the first vertical hydraulic jack and the second vertical hydraulic jack to lower the end of the long-stroke pumping unit while the wheels are on the long-stroke pumping unit.

20. The method of claim 19, further comprising:

actuating, with the hydraulic power source, the hydraulic cylinder from the extended position to the retracted position to move the long-stroke pumping unit from the first position to the second position while the wheels are on the long-stroke pumping unit.

* * * * *